United States Patent [19]

Flegel

[11] 3,951,172
[45] Apr. 20, 1976

[54] ADJUSTABLE CLEANOUT PLUMBING FITTING

[75] Inventor: George J. Flegel, Michigan City, Ind.

[73] Assignee: Josam Manufacturing Co., Michigan City, Ind.

[22] Filed: Nov. 15, 1974

[21] Appl. No.: 524,209

[52] U.S. Cl............................ 138/89; 220/256; 220/304; 277/169
[51] Int. Cl.² .................................. F16L 55/10
[58] Field of Search .............. 138/89; 220/256, 304, 220/327; 277/169, 170

[56] References Cited
UNITED STATES PATENTS

| | | | |
|---|---|---|---|
| 1,712,680 | 5/1929 | Svensson............................ | 220/304 |
| 1,835,418 | 12/1931 | McHardy............................ | 138/89 X |
| 1,951,645 | 3/1934 | Boosey................................ | 138/89 X |
| 3,157,203 | 11/1964 | Ver Nooz............................ | 220/256 X |
| 3,610,287 | 10/1971 | Allgood............................... | 138/89 |
| 3,814,276 | 6/1974 | Van Gordon et al............. | 138/89 X |
| 3,897,874 | 8/1975 | Coons.................................. | 220/304 X |

Primary Examiner—Richard C. Queisser
Assistant Examiner—Charles Gorenstein
Attorney, Agent, or Firm—P. D. Golrick

[57] ABSTRACT

Over a threaded plug closed cast metal fitting body joinable to a pipe stub end and at its top periphery bearing an integral single-turn roll male thread, there is telescoped and adjustably supported a housing assembly including a cylindrical plastic housing member, and a metal rim secured on the housing member top end providing a seat for a sealable access cover; the housing member interior over its full height having three integral pilaster-like formations each with a like series of sloped transverse grooves successively offset and spaced and shaped to provide an interrupted female thread engageable with the body male thread, so that by assembly rotation the rim is easily adjustable to be flush with an environment finish surface, for example, of poured concrete in which the fitting is embedded; thereby conducing to ease of installation as well as material, tooling and machine time fabrication costs.

10 Claims, 3 Drawing Figures

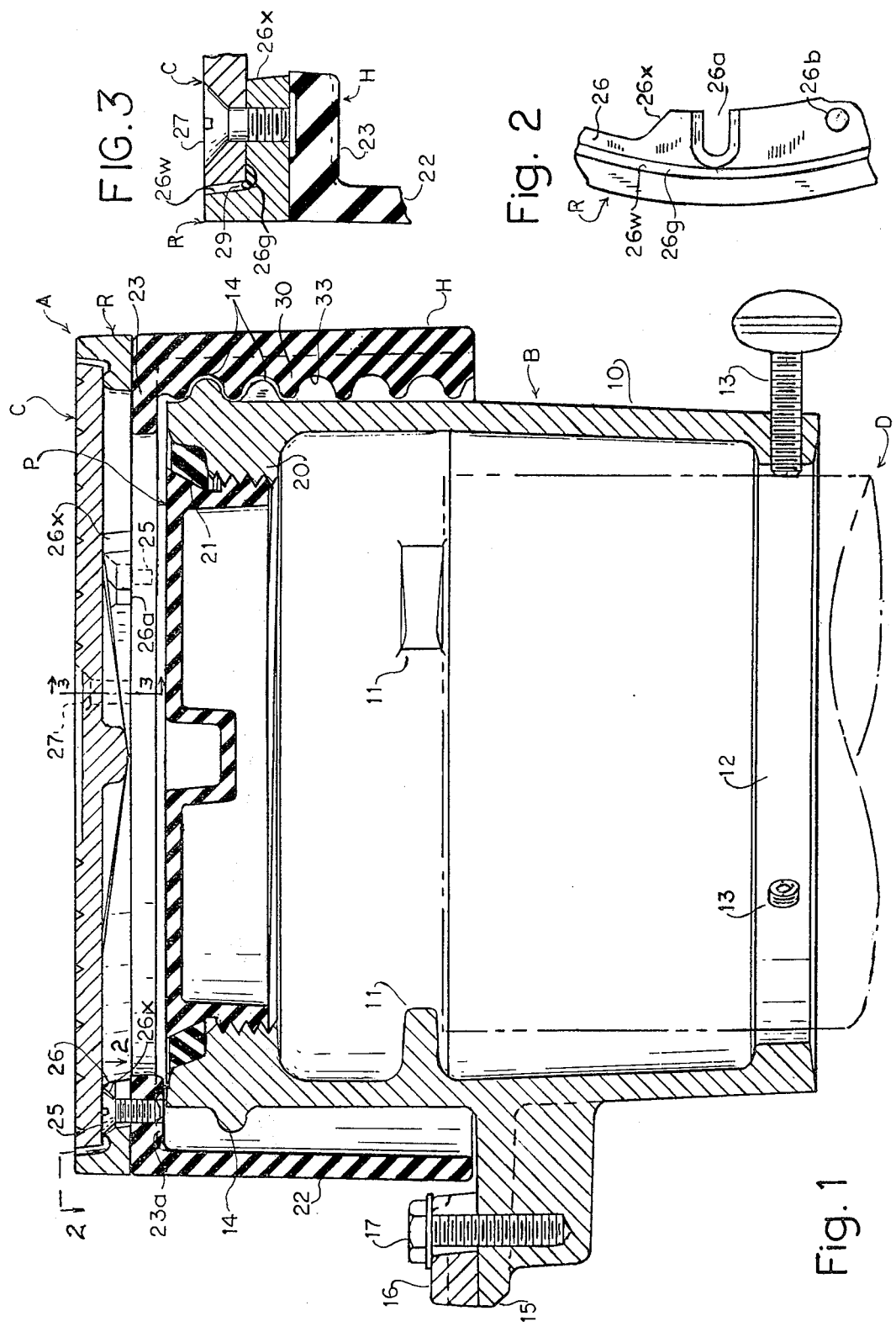
U.S. Patent   April 20, 1976   3,951,172

ADJUSTABLE CLEANOUT PLUMBING FITTING

To provide convenient entrance to or access to portions of a drainage pipe or sanitary line beneath or behind a finished surface of a floor, wall, paved area, or a like environment of masonry or poured concrete, for example, an access or cleanout plumbing fitting is installed as a termination of a pipe stub branch of the line to which access is desired; the fitting usually comprising at least a cast metal body element joined and sealed to the stub and closed by a removable sealed plug.

The prior art has proposed many fitting arrangements to obtain an overall access structure which is easily installed, neatly incorporated in the environment and convenient in use while attempting to achieve other desirable characteristics for example in cost, or durability. Because drainage or sanitary lines are roughed-in well before wall, floor, slab or paving finishing operations by other mechanics, level adjustability of the parts of the access structure to be exposed in the completed building or other location has been a prominent object of prior art activity.

Such proposals have included special stub extensions making a telescoped, hence height adjusting, joint with the stub, so that the extension top with removable plug could be set at an appropriate level; or conduit type extensions to be broken off at desired level and having a female thread in which a plug-closed, at least equivalently male-threaded, element could be adjusted and sealed by caulking if required.

Another broad approach locates a plug-closed stub terminating behind or below a concealing housing structure including a rim supporting a removable cover plate set flush with the finished surface of the environment to afford a relatively unobtrusive and esthetically acceptable access point to the plugged stub termination. To facilitate overall construction operations, the cover support structure has also been made independent of the stub terminating body, so that the stub terminating plugged body could be roughed in, and subsequently the cover support adjusted to precise position as required at the time of final finish operations on the environmental surface.

Moreover, to expedite roughing-in operations of the entire fitting relating to the plumbing installation, various connections have been proposed whereby an access cover supporting structure is attached to the stub termination body but is capable of subsequent adjustment of height as required for bringing the cover flush with the desired environment final surface.

Various expedients for these purposes have also included adjustable posts between cover support and body elements; provisions for frictional or direct threaded engagement or set screw securement between those elements enabling the cover support to be selectably positioned; a central screw element projecting from the top of the closure plug, or from a temporary or permanent web in the stub terminating body, and centrally threadedly engaged with the cover in turn affixed to the rest of the support assembly whereby through rotation of the latter and the cover support position could be changed.

These various proposals have labored under certain disadvantages, such as unreliability in maintaining selected position; or, where that unreliability is obviated, complexity or cost of structure; limited adjustability; or in being readily subject to damage subsequent to the roughing-in operations. Also in some, the adjustment structure provided for initial installation purposes would be subsequently destroyed by intended use of the fitting; or the overall fitting structure would not provide a convenient re-adjustment in the event that it should become necessary to reset the access cover, for example, in subsequent operations to refinish, repair or relevel surrounding environmental concrete or masonry.

At times such prior structures were undesirably expensive either in materials or labor costs for the fabrication as such or in the installation. By the present invention there is provided a stub terminating plug-closed body structure, basically a tubular roughly cylindrical body provided at its top end with a single turn integrally cast semi-round or roll thread on which is engaged a skirt-like portion of an access cover supporting assembly, on the interior cylindrical surface of which there are integrally formed a plurality of at least three, relatively narrow vertical sections of interrupted female threads, reaching over the entire height of the skirt portion of the assembly thus adjustably telescoped over the stub terminating body. Thus there is afforded a sturdy combination of a top or cover bearing assembly with the body on which it is easily rotated and therefore vertically adjusted.

Preferably the housing member, of stubby cylindrical form, is molded of a tough impact and water-resistant plastic such as an appropriate ABS formulation with the interrupted thread formed by narrow pilaster-like formations on the interior of the skirt, each having a series of sloped transverse equi-spaced grooves appropriately offset from one to the other series corresponding to the male thread pitch. Thus the interrupted female thread structure is easily provided with reduced material requirement in the molding of the housing member, for a loose thread engagement with the metal-conserving single turn male thread cast integrally right on the male body member.

Frictional characteristics of the plastic relative to the metal as contrasted to the metal-to-metal characteristics of cast metal render the quality of the cast metal thread surface far less critical, while retaining ease of rotation for adjustability. The interrupted female thread also enables low cost manufacture by reducing molding machine cycle time because of quick release tooling which can be used.

The structure is such that the body member may have various conventional means for anchoring the terminating body in the environment, for joining the body to the stub, for providing an appropriate closure in the body, or for clamping flashing to the body, though not dictated by novel and useful features providing the access cover assembly adjustment.

Further in the housing assembly the immediate cover support is provided by a separate rim screw-secured on the housing member top end and providing an appropriate flush seat for the access cover, so that in the adjustable assembly the exposed seat member which is subject to weathering, traffic wear, or esthetic considerations, can be of a material different from the main housing cleanout enabling employment of distinct materials appropriate to each. Thus if a relatively expensive metal requirement is limited only to the rim member, considerable metal savings are possible, in contrast with an adjustable female telescoped member and integral rim which would then have to be entirely cast metal.

The general object of the present invention is to provide an improved form of adjustable plumbing fitting structure adapted for use in a cleanout or access fitting or the like, providing a sealed termination for an access stub branch on a drainage line or a sanitary pipe, and having an adjustable cover support.

Another object of the invention is to provide a fitting of the type described providing a cover bearing assembly threadedly engaged with a stub terminating body and easily rotated for height adjustment purposes.

Another object is the provision of a fitting of the type described wherein a sturdy adjustable structure is provided in a relatively low cost design for the purposes achieved.

Another object is the provision of a plumbing fitting of the character described, wherein an environmentally exposed and visible metal rim or face structure, providing a seat for an access cover, is supported on a principal adjustable structural component fabricated from a material of lower cost or different properties.

A still further object is the provision of a fitting of the type described enabling considerable savings in fabrication costs for material, labor and machine charges.

Other objects and advantages will appear from the following description and the drawings wherein:

FIG. 1 is a vertical longitudinal or axial section of a cleanout fitting as one embodiment of the invention; and FIG. 2 is a fragmentary detail view, at 2—2 in FIG. 1;

FIG. 3 is a fragmentary enlarged section at 3—3 in FIG. 1.

In the drawing the invention is shown as embodied in a clean-out fitting, of which the principal parts are metal body B of cast iron or the like, secured and sealed through appropriate means as a termination element on drain pipe branch stub D, shown in dashed outline; a closure plug P secured in the top end of the body, by appropriate means, as by screwed engagement in the body; and, vertically adjustable relative to the body B, a housing assembly A comprised of a molded water and impact resistant plastic main housing member H, at its upper end bearing a separate rim or face plate structure R of desired form, round, square, etc. providing a seat for the flush seated removable cover C.

By the structural features hereinafter described, after the drain pipe branch stub D is roughed in with the body B connected in sealed relation by an appropriate pipe-to-fitting joint structure, the housing assembly A, as supported by the body in threaded vertically axially adjustable relation, may be rotated to shift it axially relative to the body, to bring the rim member to the plane or level desired for the finish surface of surrounding environmental structure. The assembly may be left at lowest level or in approximate ultimate position with precise positioning effected at the time of finishing the surrounding surface.

Thus, for example, in a concrete slab installation, where there is a rough pour of concrete subsequent to roughing in, to embed the piping and lower parts of the body, and a later final pour smoothed out to a finished surface, the final adjustment of the assembly A is made by rotating the same to the precise position, just before the finish layer is poured and, if necessary, even during the surface finish operations.

Though the axial shift of the housing positions relative to the body will be herein considered and termed a vertical adjustment, it is to be understood that the axis of the pipe stub may be horizontal, as coming through a portion of a wall or perhaps at other angle in some particular environmental situation.

In the drawing, the body B is shown as having structure affording a caulked joint connection with the pipe end as conventional for cast iron drainage or sewer pipe. Thus the body has integral projecting inward lugs 11 as steps for the pipe stub end, and at the bottom, surrounding the pipe receiving opening, an inward lip 12 having three equi-spaced radially tapped holes each with a respective wing type set screw as at 13; defining a conventional annular caulking recess between the pipe and the surrounding bottom cylindrical portion 10 of the body. About the body top end there is a single-turn semi-round or roll form integrally cast male thread 14.

Also part way along the body length, in a conventional arrangement there is an integral circumferential external flange 15 on which a sheet of flashing may be clamped by a flat flashing clamping ring 16 having three or more apertures, each for a respective clamping bolt 17 threaded into a corresponding tapped hole in a locally thickened region of the flange.

At the outer end of the body providing the access opening into the body end line, i.e., at the top interior body region, a female-threaded inward circumferential thick lip 20 receives the male threaded plug P, either self-sealing by use of standard taper pipe threads or as here shown, by an appropriate seal element provided between the body and the plug, such as a neoprene or other appropriate elastomeric gasket or ring 21, received in an annular recess defined between a circumferential taper shoulder of the plug, the outer side of the threaded lip 20 and an outer female taper surface of the body, wherein the seal element is compressed in plug-sealing relation.

In the housing member H, having a principal substantially cylindrical part 22 forming a dependent skirt in the assembly A, on a flat topped inward lip 23 affording a flat annular face or the outboard end of member H, the rim member element R with a matching flat bottom surface is seated and secured by flat head screws 25 passed through three equi-spaced apertures 26a of a horizontal seat portion 26, into threaded apertures in the housing member lip; the threaded apertures in the case of a plastic housing member being provided by molded-in threaded inserts at downwardly thickened lip regions, as at 23a. The top surface of lip 23 has three broad shallow clearance recesses corresponding to the spacing of threaded holes in rim R for cover screws as later described.

The rim top side (see also FIGS. 2–3) is annularly recessed corresponding to the peripheral shape of the cover to form the seat 26, here circular for a round cover, secured by a three spaced screws 27 therethrough threaded into tapped holes 26b provided in respective arcuately running inward extensions 26x of the rim seat 26. To accommodate an optional cover-sealing O-ring 29 along the bottom margin of the cover, at the outer margin of the horizontal main flat seat surface there is a circumferentially continuous seat groove 26g into which the sloping seat sidewall surface 26w merges; and, between the sidewall and the cover periphery, correspondingly inwardly tapered or sloped for manufacturing convenience and ease of cover removal after debris accumulation, a slight gap permits O-ring compression extrusion enabling cover seating contact on 26 and further extending the seal area from the cover bottom to its side surface.

Beneath flange 23, over the entire vertical height of the interior surface of the housing member cylindrical portion 22, a plurality, of at least three, equi-spaced vertical pilaster-like bars or ribs 30, each of roughly rectangular section though somewhat arcuate across its inner face, are integrally formed; each bearing a series of like semi-circular section sloped transverse grooves 33 (in shape preferably roughly complementary in vertical cross section to the half round or rolled thread shape of the male thread).

Thus bars 30 provide an interrupted female thread structure whereby housing member H, hence assembly A is threadedly engaged with the body B for relative vertical, i.e., axial, shifting of the entire assembly relative to the body B, whereby the rim and cover plate position is selectable. Slope of transverse grooves 33 and their spacing in each of the three series correspond to the male thread pitch. Of course the corresponding grooves are offset from one series to another by 1/N of the male thread pitch, N being here 3, the number of such formations.

The width or arcuate extent of the bars 30 is such that the width sum represents a small fraction of the interior surface, e.g., on the order of 1/10 to 1/12 of the inner circumference with three such bars which normally will taper from top down to a narrower bottom from draft considerations. This structure represents a considerable saving in material as contrasted with use of a full circumferential threading; reduces area of frictional sliding contact with the male thread, the later itself reduced to one turn with similar advantage; and further simplifies patterning for casting, and especially for the preferred plastic form, enables use of tooling with retractable female thread forming elements, so that the finished part is easily and quickly released without need to unscrew from a full male thread forming die part with attendant prolongation of molding machine cycle time.

Typically the body B is made of cast iron, and housing member H is molded of a plastic such as ABS; and the rim element R and cover C are cast or otherwise fabricated of a more costly alloy material, such as stainless steel, bronze, or a plated or unplated brass of appropriate composition; with of course, machining for the drilled and tapped holes for screws or bolts 13 and 17, for the retaining screws 27 and, if H is metal, for holes of screws 25, and threading for plug 20; possibly with machining for the seat or the gasket at region 21.

Since by conventional foundry techniques or plastic molding tooling design dictates certain pattern or mold drafts are required thereby affecting the product form, elements here described as cylindrical will actually be slightly tapered and it is to be understood that divergencies from cylindrical, as required by draft considerations, are contemplated in the term "cylindrical."

What is claimed is: k

1. An adjustable plumbing fitting adapted for use as a cleanout or access fitting on a drainage pipe access branch stub and to be set flush with the finish surface of surrounding environment, such as poured concrete, comprising:

a hollow body adapted to make a fluid tight joint with a said pipe stub, and having a body end portion defining an access opening into the body and bearing on its outer end a removable closure for the access opening, thereby to form a sealed termination of the stub;

said end portion at an outer end thereof having an integral single-turn male thread about its exterior surface; and a housing assembly including a hollow housing member adjustably threadedly telescoped over and onto said body end portion and bearing on its outboard end a cover removable for access to said closure and to be seated flush in said surface;

said housing member having, threaded on said male thread, an integral multi-turn interrupted female-thread of form and pitch accommodating said male thread, said interrupted female thread provided by a plurality of at least three integral, multiply-transversely grooved, narrow vertical bar or pilaster-like formations equi-angularly spaced on, and extending over substantially the length of, the interior of the housing member, the grooves of each formation comprising a series of grooves sloped and equi-spaced over the formation length corresponding to, and the series successively offset from formation to formation to correspond to, the male thread pitch, whereby said housing member is threadedly engaged with the body member for adjustment of the position of said cover relative to the body by rotation of the housing assembly.

2. An adjustable plumbing fitting as described in claim 1, wherein said body is a cast metal body; and said assembly further includes a rim member secured on the outboard end of said housing member and adapted to be embedded flush in a said finish surface and affording a cover seat, said cover being seated flush in said rim member.

3. An adjustable plumbing fitting as described in claim 2, wherein said housing member is molded of a moisture and impact resistant plastic, and said rim member is comprised of metal.

4. An adjustable plumbing fitting as described in claim 1, wherein said body has a basically hollow cylindrical form with one end bearing means cooperative with a stub end for making the fluid tight joint, and the other end affording said access opening, and bearing the single turn male thread.

5. An adjustable plumbing fitting as described in claim 4, wherein said housing member has a basically hollow cylindrical form with an inward circumferentially continuous integral lip on its cover-bearing outboard end, affording a flat outward lip surface, and said assembly further includes a rim member screw-secured on the said lip and adapted to be embedded flush in a said finish surface and affording a cover seat, said cover being seated flush in said rim member.

6. An adjustable plumbing fitting as described in claim 5, wherein said body is a metal casting.

7. An adjustable plumbing fitting as described in claim 5, wherein said said housing member is molded of a moisture and impact resistant plastic, and said rim member is comprised of metal.

8. An adjustable plumbing fitting as described in claim 7, wherein said body is a metal casting.

9. An adjustable plumbing fitting as described in claim 7, wherein
- the sum of the angular widths of said formations is no greater than one-eighth of the interior circumference of said housing member.

10. An adjustable plumbing fitting as described in claim 5, wherein
- said cover has an inwardly tapered peripheral edge,
- said cover seat is provided concentric with the axis of said housing member by a circumferential annular end recess in the rim,
- said recess being defined by a flat bottom surface supporting the cover, an inwardly convergent side wall surface complementary in shape to the periphery of the cover, but affording a slight circumferential gap with the cover, and at the outer margin of the bottom surface a seal-receiving groove into which the side wall surface merges,
- the width of said groove being partially overlapped by the outer bottom margin of the cover,
- said assembly includes an elastomeric O-ring seated at said groove continuously to seal the cover bottom margin to the rim and, by seal extrusion into said gap, the periphery of the cover to the rim.

* * * * *